A. H. JESSEN.
VARIABLE SPEED DEVICE.
APPLICATION FILED DEC. 26, 1918. RENEWED JULY 14, 1920.

1,350,255.

Patented Aug. 17, 1920.
3 SHEETS—SHEET 1.

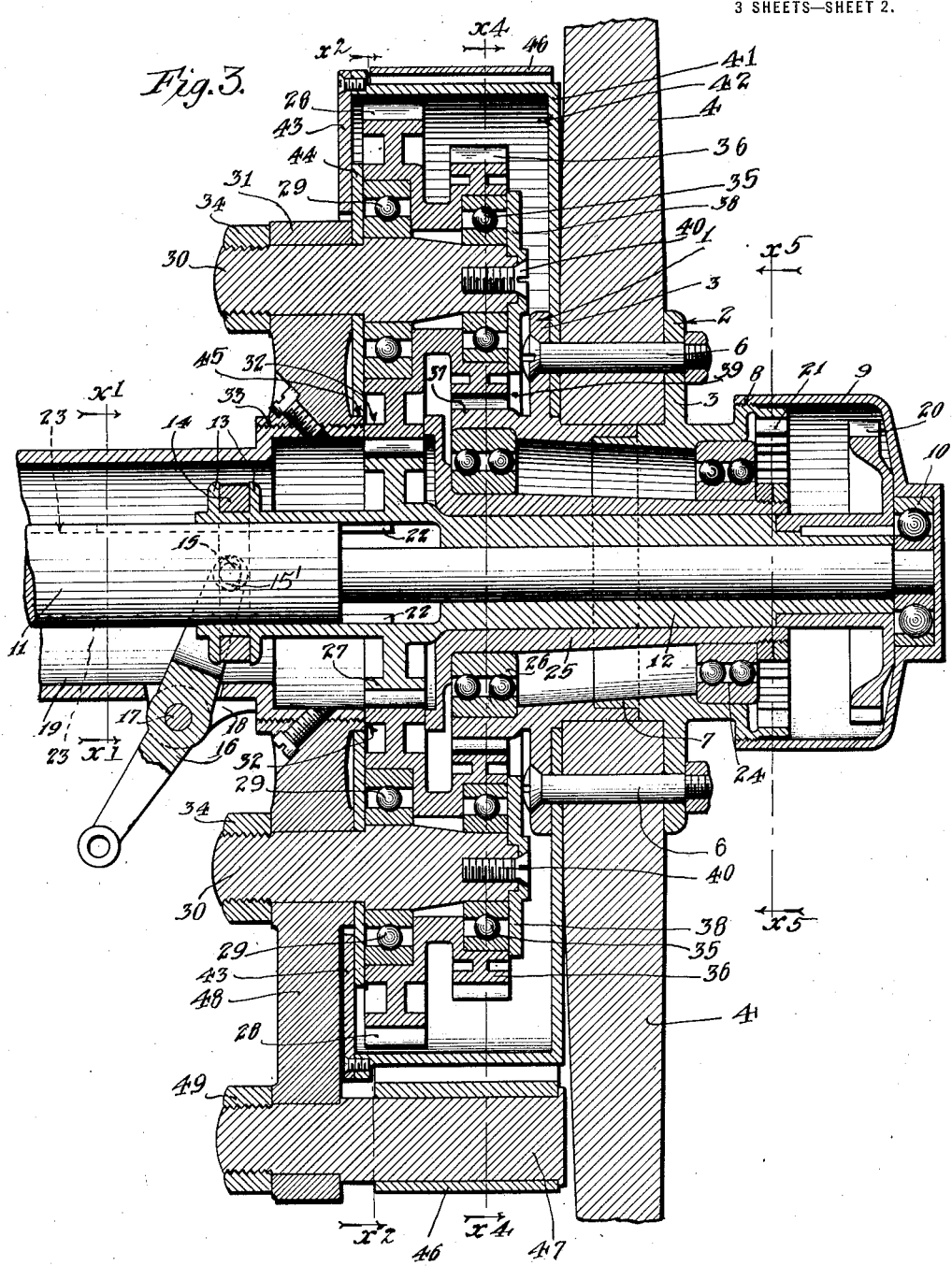
A. H. JESSEN.
VARIABLE SPEED DEVICE.
APPLICATION FILED DEC. 26, 1918. RENEWED JULY 14, 1920.
1,350,255.
Patented Aug. 17, 1920.
3 SHEETS—SHEET 2.

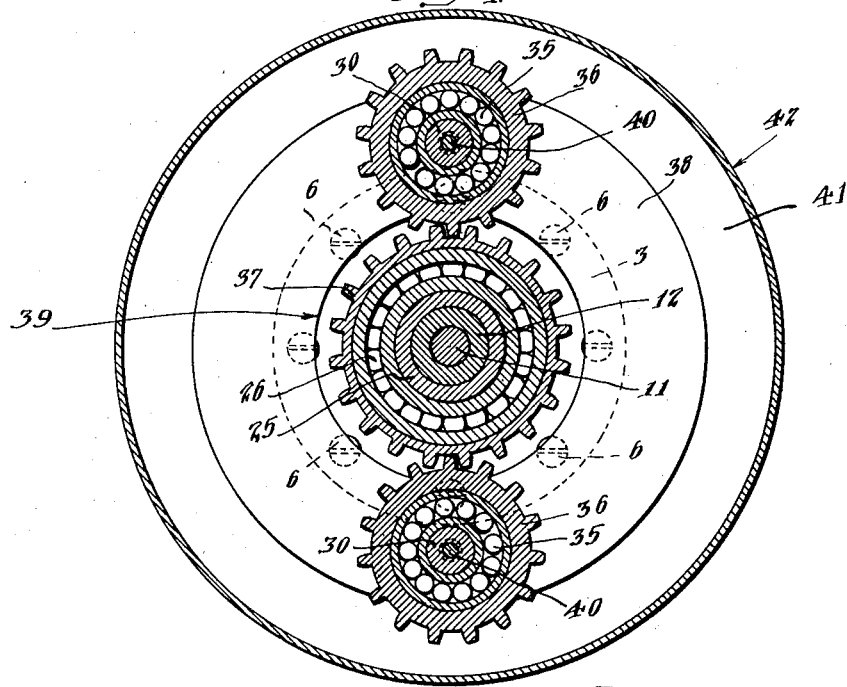
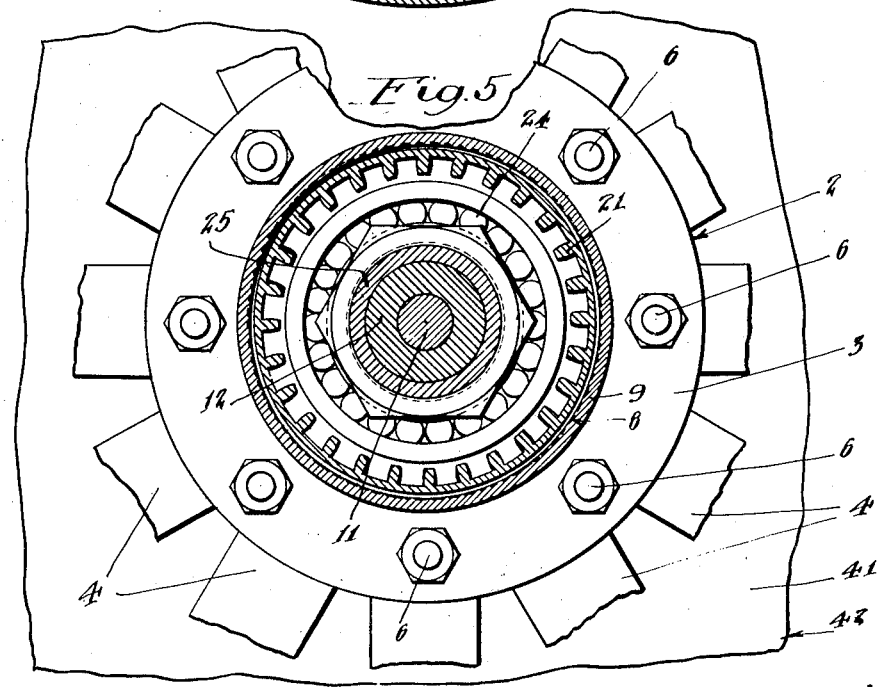

UNITED STATES PATENT OFFICE.

ARNOLD H. JESSEN, OF LOS ANGELES, CALIFORNIA, ASSIGNOR TO BIG FOUR WHEEL COMPANY, OF LOS ANGELES, CALIFORNIA.

VARIABLE-SPEED DEVICE.

1,350,255.  Specification of Letters Patent.  Patented Aug. 17, 1920.

Application filed December 26, 1918, Serial No. 268,325. Renewed July 14, 1920. Serial No. 396,331.

*To all whom it may concern:*

Be it known that I, ARNOLD H. JESSEN, a citizen of the United States, residing at Los Angeles, in the county of Los Angeles and State of California, have invented a new and useful Variable-Speed Device, of which the following is a specification.

This invention pertains to variable speed devices and more particularly to such a device in which is embodied the drive wheel of a vehicle as a part thereof so as to supplement the ordinary change speed device with which vehicles are generally equipped.

An important object of the invention is to make possible, when desired, a relatively large increase in leverage applied to the drive wheels of the vehicle, without increase in size of the axle and those portions of the driving connections extending between the axle and the engine.

Another object is to produce direct driving of the drive wheels of a vehicle from the axle and also drive from the axle through a system of speed reducing gears when lower speed or higher power is desired.

Another object is to make provision in the device for its easy assembling with and disassembling from the axle of the vehicle so that repairs can be readily made in the device or a new device of the same character substituted if substitution is advisable or necessary.

Another object is to provide a device of this character of comparatively simple construction and one that is reliable in operation.

Another object is to make provision for housing a portion of the change speed gearing inside of a brake drum.

Other objects and advantages will appear in the subjoined detail description.

The accompanying drawings illustrate the invention.

Figure 1 is an elevation of the inner side of a construction embodying the invention, the axle and housing being shown in section on line indicated by $x^1$—$x^1$, Fig. 3.

Fig. 2 is a reduced elevation partly in section on line indicated by $x^2$—$x^2$, Fig. 3, the brake band and its operating connections being omitted.

Fig. 3 is an enlarged vertical section on line indicated by $x^3$—$x^3$, Fig. 1, the axle and its housing being fragmentarily shown.

Fig. 4 is a sectional elevation, similar to Fig. 2, on line indicated by $x^4$—$x^4$, Fig. 3.

Fig. 5 is an enlarged fragmental sectional elevation on line indicated by $x^5$—$x^5$, Fig. 3.

There is provided a sectional wheel hub, comprising inner and outer sections 1, 2 respectively, provided with flanges 3, between which are clamped spokes 4 to which are fastened a rim 5 in any suitable manner. The rim is provided with a tire $a$ of any suitable construction. The hub, spokes and rim together constitute a vehicle drive or traction wheel.

Passing through the flanges 3 and spokes 4 are bolts 6 which secure the spokes and hub to one another. These bolts 6 force the hub sections toward one another and the outer hub section is provided with a reduced portion 7 at its inner end to fit tightly into the outer end of the inner section.

The outer hub section 2 is screw threaded at 8 to hold a detachable cap 9, which is provided internally with a suitable bearing 10. The bearing 10 serves to journal the outer end of a vehicle axle which is fragmentarily indicated at 11 in Fig. 3.

Shiftable endwise on the shaft 11 is a sleeve 12, which is provided at its inner end with shoulders 13, between which is positioned a shifting ring 14. The ring 14 is pivoted at 15 to a lever 16 which in turn is pivoted at 17 to a suitable support, the pivots 15 engaging circumferentially extending slots 15' in the ring 14. In this instance the pivot 17 is supported by ears 18 of the axle housing 19 which surrounds the axle 11. The axle housing 19 is only fragmentarily shown in Fig. 3. The axle and axle housing are not parts of the invention but merely coöperate therewith. The lever 16 is adapted to be operated by any suitable means, not shown, from a position adjacent the driver's seat on the vehicle. It is clear that moving of the lever 16 causes shifting of the sleeve 12 endwise of the shaft 11.

Keyed on the outer end of the sleeve 12 is a spur gear 20 which is housed in the cap 9 and is in disengaged position when the sleeve 12 is in its outermost position. When the sleeve 12 is moved inward it causes the gear 20 to mesh with an internal gear 21 formed on the outer end of the outer hub section 2. The gears 20, 21 constitute clutch means and thus, when they are in mesh with one another, turning of the sleeve 12 will cause turning of the spokes 4 of the wheel. The sleeve 12 is caused to turn with the axle 11 by reason of splines 22 which project from the inner face of the sleeve into splineways 23 extending longitudinally in the periphery of the axle 11. The outer hub section 2 is journaled by a bearing 24 on a hollow stationary spindle 25 through which the sleeve 12 extends. The inner hub section 1 is journaled by a bearing 26 on the spindle 25. Thus the hub of the wheel is rotatively mounted on the stationary spindle 25 and is therefore loose on the axle.

The sleeve 12 is provided near its inner end with a spur gear 27 which is so positioned relative to the gear 20 that, when the gear 20 is in the disengaged position shown in Fig. 3, the gear 27 will mesh with gears 28 rotatively mounted by bearings 29 on studs 30. In the instance shown in the drawings there are provided two gears 28 and studs 30, but it is understood that the number may be more or less if desired. The gears 28 project through openings 32 in the spindle 25.

The studs 30 are stationarily mounted and for this purpose their outer ends project through radial arms 31 formed on the inner end of the spindle 25 which is screw threaded at 33 on or may be otherwise secured to the housing 19. The outer ends of the studs 30 are provided with nuts 34 which seat against the arms 31 to securely hold the studs 30 in place.

At their inner ends the studs 30 are provided with bearings 35 on which are journaled gears 36 which, in the instance shown, are of integral construction with the gears 28.

It is now clear that, when the sleeve 12 is in its outermost position so as to cause the gear 27 to mesh with the gears 28, turning of the shaft 11 will cause turning of the gears 28 and this in turn will cause turning of the gears 36. The gears 36 mesh with a gear 37 formed on the inner end of the inner hub section 1 so as to drive the wheel hub 1, 2. The train of gears 27, 28, 36, 37 forms a speed reduction gearing between the axle 11 and the wheel hub and becomes effective when the gear 27 is in mesh with the gears 28. The gears 20, 21 constitute a clutch to effect direct drive between the axle 11 and the wheel hub when the gears 20, 21 are in mesh with one another.

The inner ends of the studs 30 are joined to one another by a plate 38 which is provided with a central opening 39 to accommodate a portion of the inner hub section 1 projecting therethrough. The plate 38 is fastened to the inner ends of the studs 30 by screws 40 and serves to hold the inner ends of said studs rigidly and the outer ends of said studs are suitably held by the arms 31.

Clamped between the spokes and flange 3 of the inner hub section 1 is an annular flange 41 of a brake-drum indicated in general by the character 42. The bolts 6 pass through the flange 41 and serve to secure the brake-drum in place. The brake-drum 42 forms a housing for the gears 27, 28, 36, 37 and their bearings.

Between the gears 28 and the inner head 43 of the brake drum is positioned a plate 44 through which the studs 30 pass. The plate 44 is an annulus, the opening 45 thereof accommodating the arms 31 and axle housing. The head 43 overlaps the plate 44 so as to make a dust-proof joint between the head and plate and prevent leakage of grease from the inside of the brake-drum.

The brake-drum 42 is provided with a suitable brake-band 46 which is tightened against the drum by any suitable means. In the drawings one end of the brake-band 46 is fastened to a stud 47 which projects from an extension 48 of one of the arms 31. The stud 47 is provided on its inner end with a nut 49 which seats against the inner face of the arm extension 48 so as to securely hold the stud 47 in place. The other end of the brake band 46 is pivoted at 50 to a lever 51 which in turn is pivoted at 52 to a bracket 53 that may project from the arm extension 48 or any other suitable stationary support.

It is understood that the parts described above will be provided in duplicate sets on the vehicle, one set being for each end of the axle.

The foregoing makes clear the construction and operation of the invention and the operation may be summarized as follows:

When the operator of the vehicle desires to cause turning of the drive wheels at a lower speed than the shaft 11 so as to secure greater application of power to the wheels he will cause the lever 16 for each wheel to be moved to the position shown in Fig. 3, thus causing the gear 27 to mesh with the gears 28, and holding the gear 20 out of engagement with the gear 21. This, as above explained, causes driving of the wheel through the reduction gearing. When the operator desires to drive the wheel at the same speed as the axle 11 he will cause the lever 16 of each wheel to be shifted to such position as to move the gear 27 out of mesh with the gears 28 and to move the gear 20 into mesh with the gear 21. This locks the shaft 12 to the wheel hub so that they rotate together.

Owing to the speed reduction gearing being between the axle and the wheel, no increase in size of the axle and other driving connections of the vehicle is necessary and thus this invention provides for application of greater leverage to the drive wheels of existing motor vehicles without any radical changes being required in the driving connections.

It is understood that the invention in its broader phases is not limited to the exact details of construction described above and shown in the drawings, but that such changes and modifications may be made as lie within the spirit and scope of the appended claims.

I claim:

1. In a variable speed device, the combination with a vehicle axle and a housing therefor, of a spindle fastened to the axle housing and having an opening, a wheel journaled on the spindle, a gear fastened to the wheel, reduction gearing to drive said gear extending through the opening in the spindle, clutch means between the wheel and axle, and means either to connect the reduction gearing with the axle inside of the spindle or to throw the clutch means into engagement.

2. In a variable speed device, the combination with a vehicle axle and a housing therefor, of a spindle fastened to the axle housing, a sleeve shiftable endwise on the axle and rotative therewith, a wheel having a hub and journaled on the spindle, gears on the hub, an arm on the spindle, a stud mounted on the arm, gears on the stud rotative together, one of the last named gears engaging one of the gears on the hub, gears on the sleeve, one of the gears on the sleeve being adapted to engage the other gear on the stud when the sleeve is in one position and the other gear on the sleeve being adapted to engage the other gear on the hub when the sleeve is in another position, and means to move the sleeve into said positions.

3. In a variable speed device, the combination with a vehicle axle and a housing therefor, of a hollow spindle connected with the axle housing, a wheel journaled on the spindle and provided with a hub, a cap detachably fastened to the outer end of the hub, a bearing in the cap for the outer end of the axle, a drum fastened to the wheel hub, a sleeve shiftable on the axle and rotative therewith, gears on the sleeve, one of said gears being housed in the cap, a gear on the hub adapted to be engaged by the last named gear when the sleeve is shifted to one position, another gear on the hub, a train of gears in the drum engaging the other gear on the hub and adapted to be engaged by the other gear on the sleeve when said sleeve is shifted to another position, said train of gears being mounted on the spindle, and means to shift the sleeve into different positions.

4. In a variable speed device, the combination with a vehicle axle and a housing therefor, of a hollow spindle connected with the axle housing, a wheel journaled on the spindle and provided with a hub, a drum fastened to the wheel hub, a sleeve shiftable on the axle and rotative therewith, gears on the sleeve, a gear on the hub adapted to be engaged by one of the gears on the sleeve when the sleeve is shifted to one position, another gear on the hub, arms on the spindle, studs fastened at one end to the arms respectively, a plate fastened to the other ends of the studs, gears journaled on the studs, the gears on each stud rotating together, one of the gears on each stud engaging the other gear on the hub, the other gear on the sleeve being adapted to engage the other gears on the studs when the sleeve is shifted to another position, and means to shift the sleeve into said different positions.

5. In a variable speed device, the combination with a vehicle axle and a housing therefor, of a hollow spindle connected with the axle housing, a wheel journaled on the spindle and provided with a hub, a drum fastened to the wheel hub, a sleeve shiftable on the axle and rotative therewith, gears on the sleeve, a gear on the hub adapted to be engaged by one of the gears on the sleeve when the sleeve is shifted to one position, another gear on the hub, an arm on the spindle, a stud on the arm, a train of gears in the drum rotative on the stud and engaging the other gear on the hub and adapted to be engaged by the other gear on the sleeve when said sleeve is shifted to another position, means to shift the sleeve into said different positions, there being a head to the drum having an opening to accommodate the arm and stud, and a plate having an opening to accommodate the spindle and overlapping the drum head, the stud projecting through said plate.

6. In a variable speed device, the combination with a vehicle axle and a housing therefor, of a hollow spindle fastened to the axle housing, a wheel loosely mounted on the spindle, a control member movably mounted on the housing, a sleeve between the spindle and axle connected with the control member, and means controlled by movement of the sleeve into different positions to drive the wheel from the axle at different speeds relative to the speed of the axle.

7. In a variable speed device, the combination with a vehicle axle and a housing therefor, of a spindle connected at one end to the housing, a wheel surrounding the spindle and journaled thereon, a control member movably mounted on the housing, and means controlled by moving the control member into different positions to drive the wheel from the axle at different speeds relative to the speed of the axle.

8. In a variable speed device, the combination with a vehicle axle and a housing therefor, of a spindle connected at one end to the housing and provided with an opening, a wheel loosely mounted on the spindle, a gear detachably connected with the axle, a train of gears connected with the wheel and extending through the opening in the spindle and engaging the first named gear, and means to connect the axle and wheel together for direct drive when the first named gear is not connected with the axle.

9. In a variable speed device, the combination with a vehicle axle and a housing therefor, of a spindle connected at one end to the housing and provided with an opening, a wheel loosely mounted on the spindle, a sleeve shiftable endwise in the spindle and adapted to turn with the axle, a train of gears connected with the wheel and extending through the opening in the spindle, a gear mounted on the sleeve to engage the train of gears, means to shift the sleeve, and means operative by shifting of the sleeve to one position to connect the sleeve and wheel together for direct drive, the sleeve when moved to said position disconnecting the last named gear from the axle so that rotation of the axle will not operate said train of gears.

10. In a variable speed device, the combination with a vehicle axle and a housing therefor, of a spindle surrounding a portion of the axle and connected at one end to the housing, a wheel surrounding the spindle, bearings for the wheel near opposite ends of the spindle, a cap extending over the outer end of the spindle and connected with the wheel and having a bearing for the outer end of the axle, and variable speed transmission means between the axle and wheel.

Signed at Los Angeles, California, this 17th day of December, 1918.

ARNOLD H. JESSEN.

Witnesses:
GEORGE H. HILES,
E. G. BLASDEL.